United States Patent [19]

Wallestad et al.

[11] Patent Number: 5,425,571

[45] Date of Patent: Jun. 20, 1995

[54] SPLIT SYSTEM FULL-FUNTION VALVE SYSTEM FOR HEAVY DUTY SEMI-TRAILER BRAKE SYSTEMS

[75] Inventors: Steven D. Wallestad; Darin R. Billot, both of Kansas City, Mo.

[73] Assignee: Midland Brake, Inc., Kansas City, Mo.

[21] Appl. No.: 149,288

[22] Filed: Nov. 9, 1993

[51] Int. Cl.⁶ .................................................. B60T 15/52
[52] U.S. Cl. ........................................... 303/7; 303/69; 303/80
[58] Field of Search ................ 303/7, 9, 28–30, 303/40, 44, 70, 71, 78, 80, 85, DIG. 1, DIG. 2, 8, 36, 68, 69; 188/170

[56] References Cited

U.S. PATENT DOCUMENTS

| | | | |
|---|---|---|---|
| Re. 330,205 | 2/1980 | Carton et al. | 303/7 |
| 4,042,281 | 8/1977 | Ury | 303/29 |
| 4,080,004 | 3/1978 | Ury | 303/9 |
| 4,163,585 | 8/1979 | Ury | 303/9 |
| 4,182,535 | 1/1980 | Fannin | 303/9 |
| 4,226,482 | 10/1980 | Stäble et al. | 303/37 X |
| 4,472,001 | 9/1984 | Fannin | 303/9 |
| 4,593,954 | 6/1986 | Campanini | 303/7 |
| 4,915,456 | 4/1990 | Gross et al. | 303/9 |
| 5,061,015 | 10/1991 | Cramer et al. | 303/7 |
| 5,236,250 | 8/1993 | Moody et al. | 303/7 |
| 5,322,353 | 6/1994 | Wallestad | 303/37 X |

Primary Examiner—Robert J. Oberleitner
Assistant Examiner—Alfred Muratoro
Attorney, Agent, or Firm—St. Onge Steward Johnston & Reens

[57] ABSTRACT

A full function brake valve for a semi-trailer is contained within a single housing and provides ports for receiving supply air and control air, and for delivering and receiving air from reservoirs, service brakes and spring brakes, and delivering air to an exhaust. The internal valves include a reservoir check valve and a relay valve to respectively pressurize a reservoir and to deliver supply air to service brakes. A secondary reservoir is supplied via a secondary reservoir check valve and a secondary reservoir outlet in the full function valve, or in a secondary relay valve, and is controlled by a secondary relay valve module to provide a redundant braking system for additional safety.

7 Claims, 10 Drawing Sheets

SPLIT SYSTEM FULL-FUNTION VALVE SYSTEM FOR HEAVY DUTY SEMI-TRAILER BRAKE SYSTEMS

BACKGROUND OF THE INVENTION

1. Field of the Invention

This invention relates to an improved full-function brake valve system for use in fluid braking systems used on the semi-trailers of highway tractor-trailer vehicles.

2. Discussion of the Prior Art

To meet all of the emergency and service requirements for highway tractor-trailer combinations, while meeting all of the pertinent governmental regulations, including Federal Regulation FMVSS 121 (Docket 90-3, Notice 2), the trucking industry has resorted to a number of trailer brake valve arrangements which have led to complexity, high costs, installation and maintenance difficulties and related problems.

FMVSS 121 is an important safety standard that applies to highway tractor-trailer vehicles; it requires that the spring brakes, which are spring loaded to engage the brake drums when the braking system air pressure drops below the operating pressure necessary to operate the service brakes, become engaged within certain specified time periods. This provides emergency braking when the service brakes become inoperative.

In a typical semi-trailer braking system, a spring brake control valve may be employed to supply pressurized air to the spring brake chambers to release the spring brakes, and also to exhaust air from the spring brake chambers when the spring brakes are to be again applied. The brake system, however, must be designed so that the spring brakes are not released prematurely, that is, prior to pressurization of the reservoir for operating the service brakes. Safety considerations dictate that the service brake function be enabled by such reservoir pressurization prior to release of the spring brakes. However, it is also desirable that the braking system have a reasonably short period to become effective. Otherwise the user may be tempted to defeat the safety system to avoid long delays in start-up of a tractor-trailer rig.

Illustrative of the prior art is Gross et al. U.S. Pat. No. 4,915,456 and patents cited therein, i.e., Ury U.S. Pat. Nos. 4,042,281, 4,080,004 and 4,163,585; Fannin U.S. Pat. No. 4,182,535; and Carton et al. U.S. Pat. No. Re. 30,205 (Reissue of U.S. Pat. No. 3,922,064). Still other illustrative prior art includes Fannin U.S. Pat. No. 4,472,001 and Campanini U.S. Pat. No. 4,593,954 and the patents cited therein. Also relevant is U.S. Pat. No. 5,236,250, the disclosure of which is hereby incorporated by reference. None of these patents disclose or suggest a valve system having the features of safety provided by the present invention.

OBJECTS OF THE INVENTION

It is an object of the present invention to provide an improved brake valve system for heavy-duty highway trailers which performs all of the required functions of a tractor trailer braking system and otherwise meets all of the requirements of the aforementioned Federal Regulation.

It is another object to provide a single, compact full-function brake valve which is suitable for use with duplicate supply air reservoirs to provide redundant service brake control capability for system safety.

Other objects, aspects and features of the present invention in addition to those mentioned above will be pointed out in or will be understood from the following detailed description provided in conjunction with the accompanying drawings.

SUMMARY OF THE INVENTION

The present invention provides a full function valve, comprising a valve housing having a plurality of ports therein, and communicating passageways linking the ports, and internal valves. The ports comprise a supply air inlet, a control air inlet, at least one spring brake outlet, at least one service brake outlet, a reservoir outlet, a spring brake exhaust, and a service brake exhaust, all extending through the outer wall of the housing. The internal valves include a pressure protection valve, first and second check valves, one or more reservoir check valves, a quick release valve, and one or more relay valves.

The full function valve preferably further comprises a secondary reservoir check valve located between a secondary reservoir outlet and a passageway connecting the pressure protection valve and the reservoir check valve. Alternatively, a secondary reservoir check valve may be located in a secondary relay valve. A secondary reservoir is provided in fluid communication with the secondary reservoir outlet and a secondary relay valve module is provided in fluid communication with the secondary reservoir, and is operable to provide supply air to a second service brake chamber.

BRIEF DESCRIPTION OF THE DRAWINGS

The present invention may be more clearly understood from the following description of a specific and preferred embodiment read in conjunction with the accompanying schematic and detailed drawings; wherein.

Figure 1:
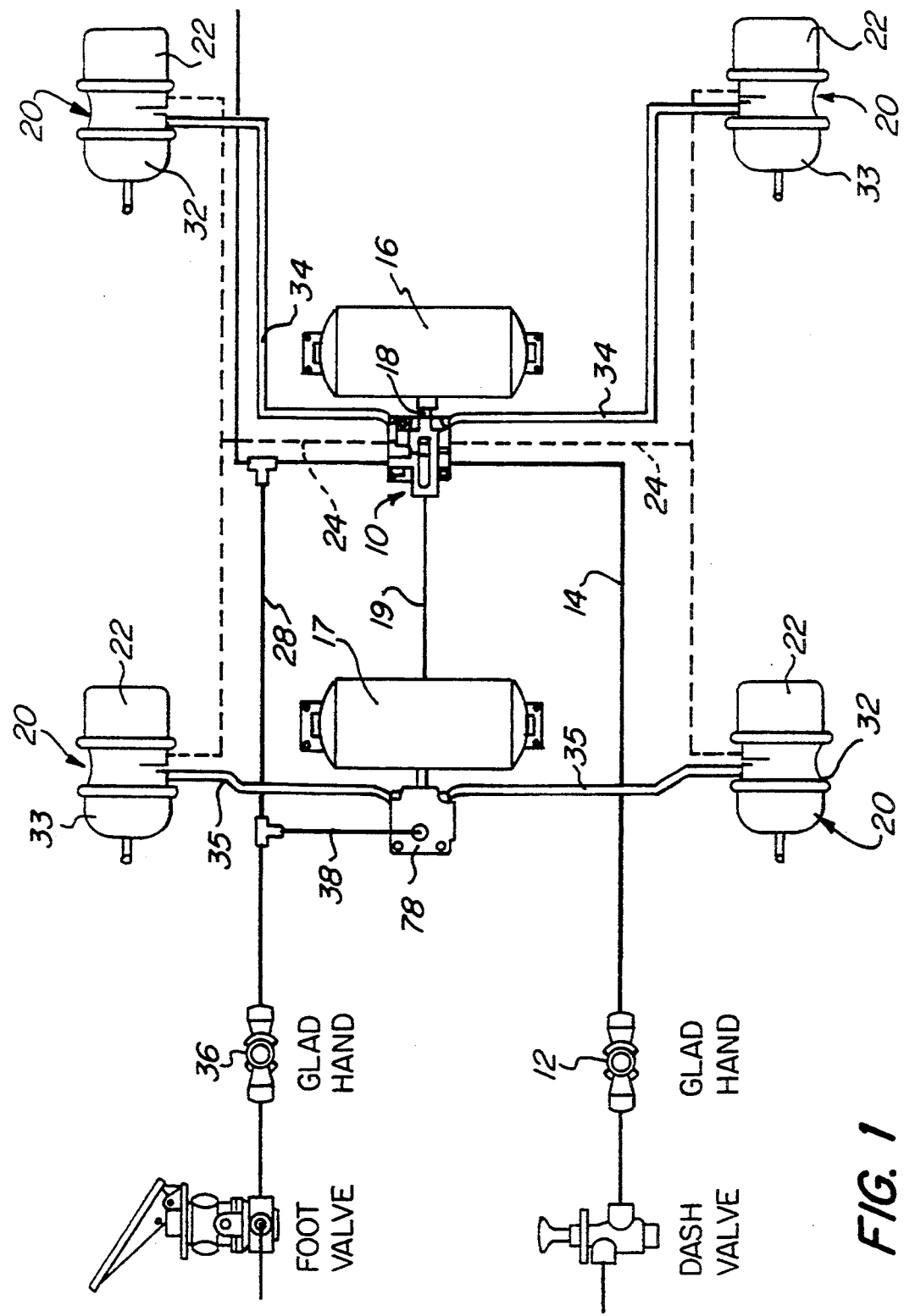
FIG. 1 is an overall schematic of a semi-trailer split brake system and full-function valve of the present invention.

It should be understood that the drawings are not necessarily to exact scale and that certain aspects of the embodiments, particularly the functional schematics of FIGS. 2A–2E, are illustrated by graphic symbols, schematic representations and fragmentary views. It should be also understood when referring to physical relationships of components by terms such as "upper", "lower", "upward", "downward", "vertical", "horizontal", "left", "right" or the like, such terms usually have reference to the orientation depicted in the drawings. Actual embodiments or installations thereof may differ, depending upon the particular semi-trailer for which the braking system is designed. It should also be understood that the term "passageway" is not necessarily limited to a tubular path or other regularly-shaped passage but also encompasses fluid communicating spaces, chambers and the like.

DETAILED DESCRIPTION OF DRAWINGS

Referring to FIG. 1, the schematic represents a semi-trailer tandem brake system including a unitary full-function valve 10 in accordance with the present invention. Pressurized supply air, typically at about 125 psig, is received into the system from a supply source (not shown) of the tractor-trailer combination via trailer gladhand connector 12 and is communicated to full-function valve 10 via line 14.

The pressurized air is directed by valve 10 to reservoir tank 16 via line 18 and to secondary reservoir tank 17 via line 19. Pressurized air is also directed by full-function valve 10 to the brake actuators 20, the spring brake chambers 22 thereof being in fluid communication with full-function valve 10 via lines 24, and the service brake chambers 32 of one rear set of actuators 20 being in fluid communication with full-function valve 10 via lines 34, and the service brake chambers 32 of the front set of actuators 20 being in fluid communication with secondary relay valve module 78. Control air from the tractor for controlling the service brakes is received via gladhand 36 and communicated to full-function valve 10 and secondary relay valve module 78 via lines 28 and 38.

The pressurized air which fills the reservoirs and actuates the spring and service brakes is referred to herein as "supply air", and the pressurized air which controls the full function valve 10 and secondary relay valve module 78 is referred to herein as "control air".

Initially, upon charging of the brake system, the spring brake chambers 22 of brake actuators 20 receive pressurized air through full-function valve 10 from the tractor via gladhand connector 12 and line 14, while the reservoirs 16 and 17 are simultaneously pressurized to enable the service brake capability.

In the following detailed descriptions of the full-function valve 10 in FIGS. 2A–2E, 3A–E, and 4–5, the same reference numerals are used so that the respective descriptions can be more readily related and understood.

Referring to FIGS. 2A–2E, unitary full-function valve 10 in a trailer brake system is shown. The following discussion also relates to FIGS. 3A–E, 4 and 5.

Supply air line 14 is connected to housing 40 of full-function valve 10 at supply air inlet 42. Control air line 28 is connected to valve housing 40 at control air inlet 44. Line 18 to reservoir 16 is connected to valve housing 40 at reservoir outlet 45. Line 24 to the spring brake chambers 22 is connected to valve housing 40 at spring brake outlet 46. Line 34 to the service brake chambers 32 is connected to housing 40 at service brake outlet 48. Secondary reservoir outlet 49 connects unitary valve 10 to secondary reservoir 17 via line 19.

Unitary full-function valve 10 houses within body 40 a plurality of valve assemblies, namely, quick release valve 50, first check valve 52, biased pressure protection valve module 54, second check valve 56, reservoir check valve 57, and relay valve module 58.

Valve 10 preferably also includes an anti-compounding check valve 59 connected by internal (or external) passageways to the control air inlet and the supply air inlet.

Figure 2A:
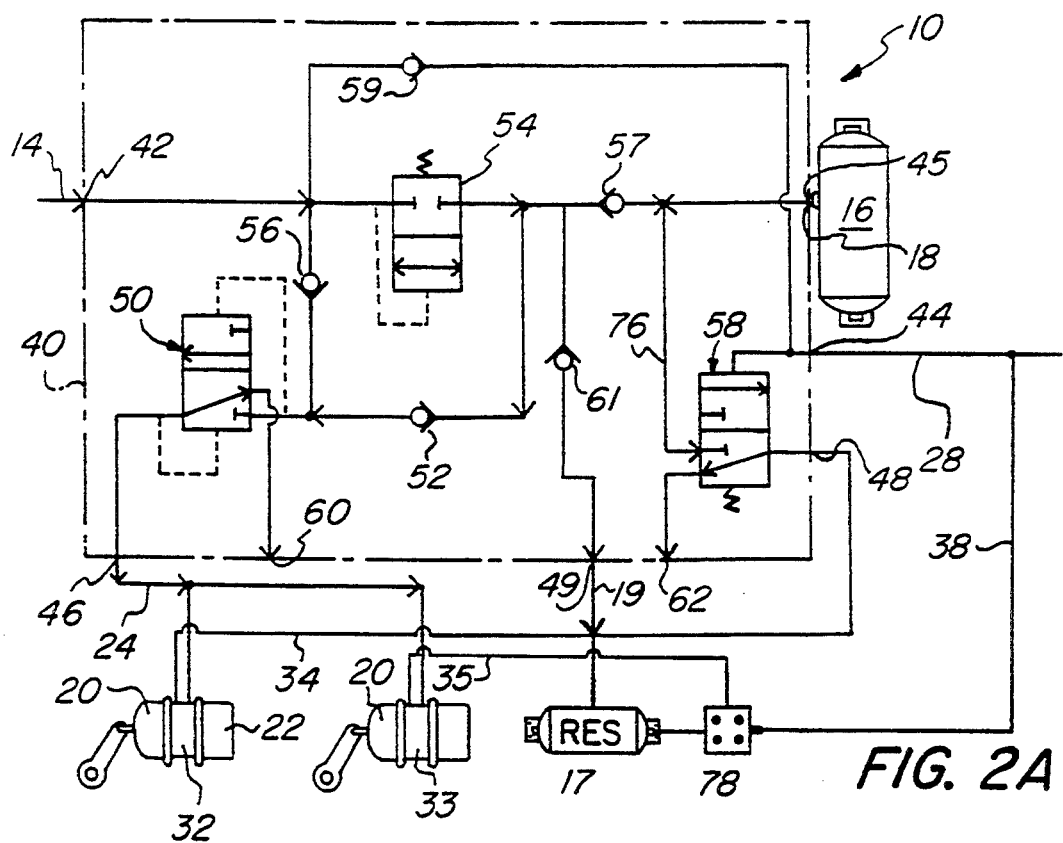
FIGS. 2A–2E are functional schematics of the split brake system of the present invention illustrating various functional modes of the full-function valve during the charging of the brake system and subsequent braking cycles.
Figure 3A:
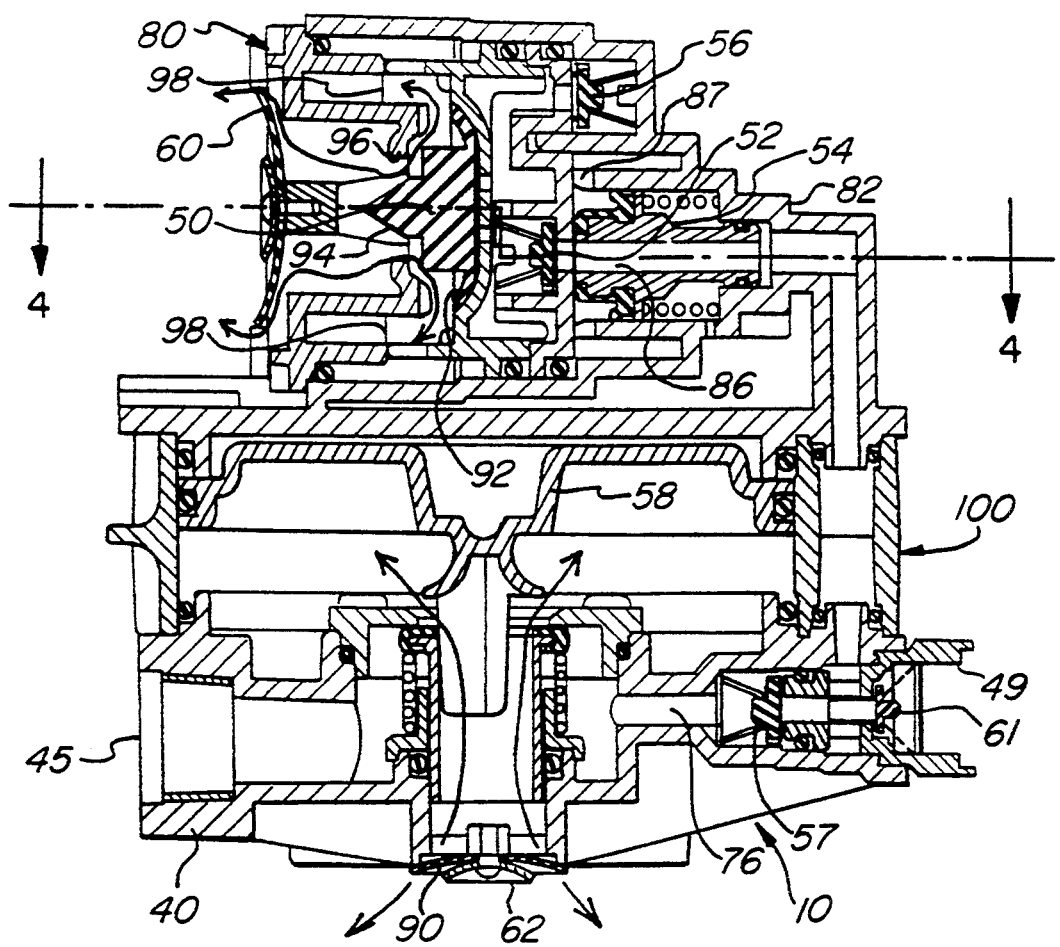
FIGS. 3A–3E are cross-sectional elevational views of an embodiment of a split system full function valve in accordance with the invention in the functional modes corresponding to the functional modes shown in schematic FIGS. 2A–2E.
Figure 4:
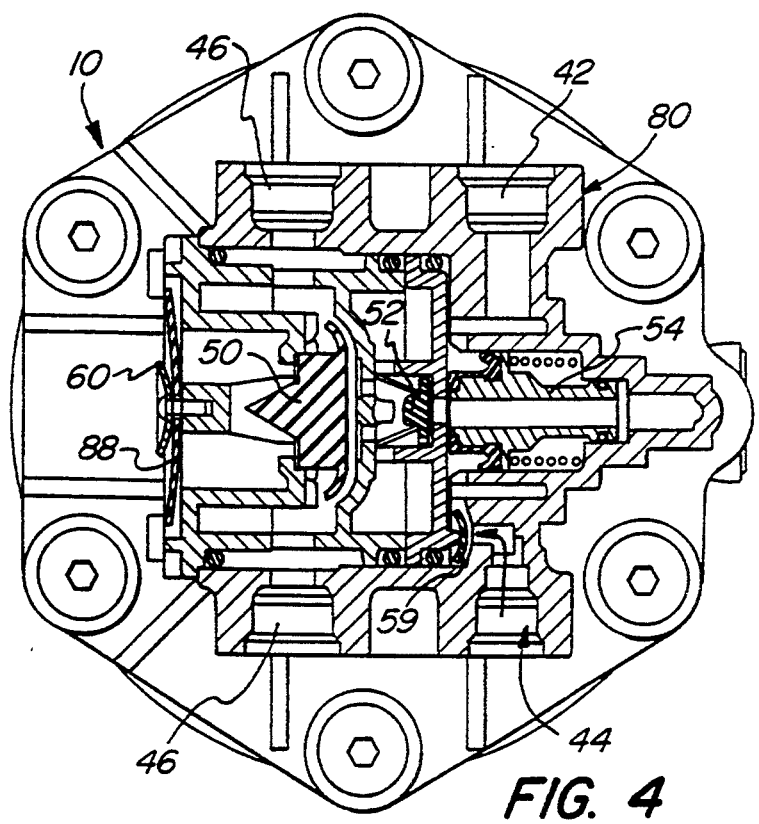
FIG. 4 is a cross-sectional top plan view of the full function valve shown in FIG. 3A.

Referring now to FIGS. 2A, 3A and 4, service brakes 32 and 33 are vented to the atmosphere. Spring brakes 22 are also vented to the atmosphere and are therefore applied. Supply line 14, control lines 28 and 38, reservoir lines 18 and 19, spring brake chamber line 24 and service brake chamber lines 34 and 35 are all at atmospheric pressure.

The spring brake exhaust outlet 60 in housing 40 and the service brake exhaust outlet 62 in housing 40 vent the braking system so that it is at rest. In the at-rest position, spring brake line 24, which is attached to spring brake outlet 46 of valve housing 40, is vented by the quick release valve 50 to exhaust port 60, whereby the spring brake chambers are vented to the atmosphere so that the spring brakes are fully applied. The service brake line 34, which is attached to service brake outlet 48 of valve body 40, is vented by relay valve module 58 to exhaust port 62 so that the service brakes are not operable. It is to be appreciated that exhaust ports 60 and 62 may comprise the same physical port if so desired.

Figure 2B:
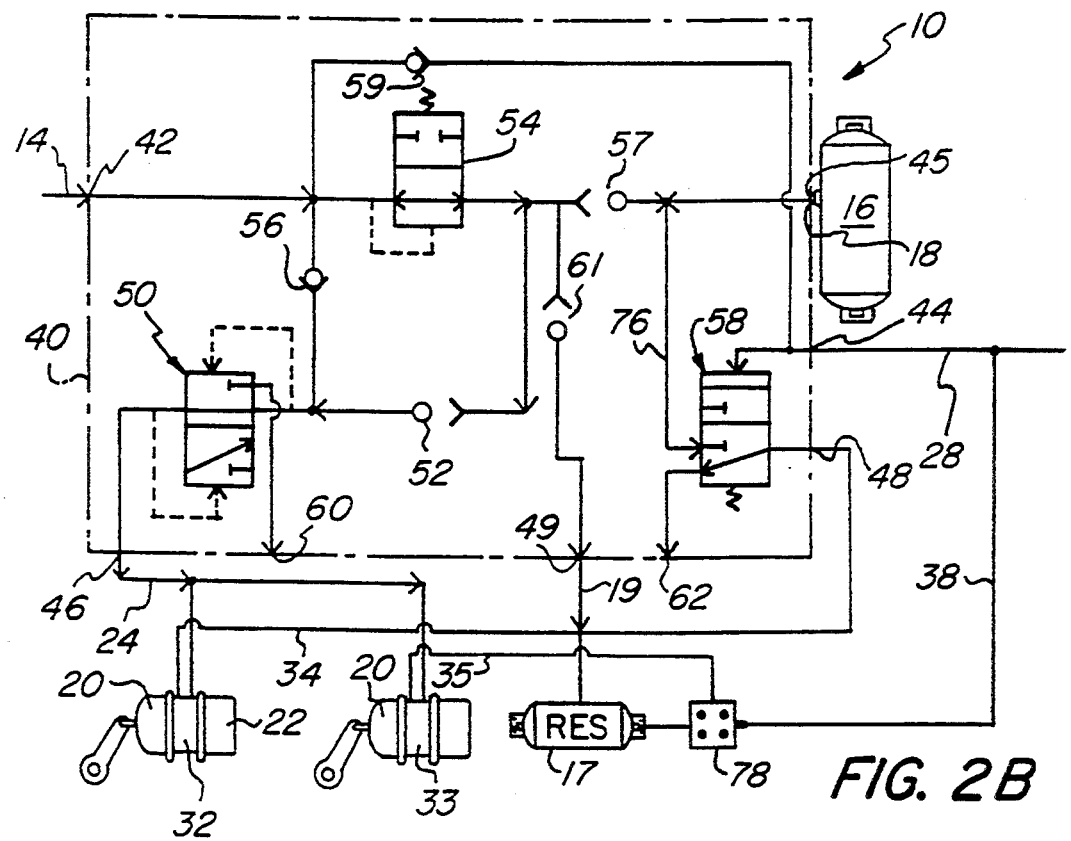
Figure 3B:
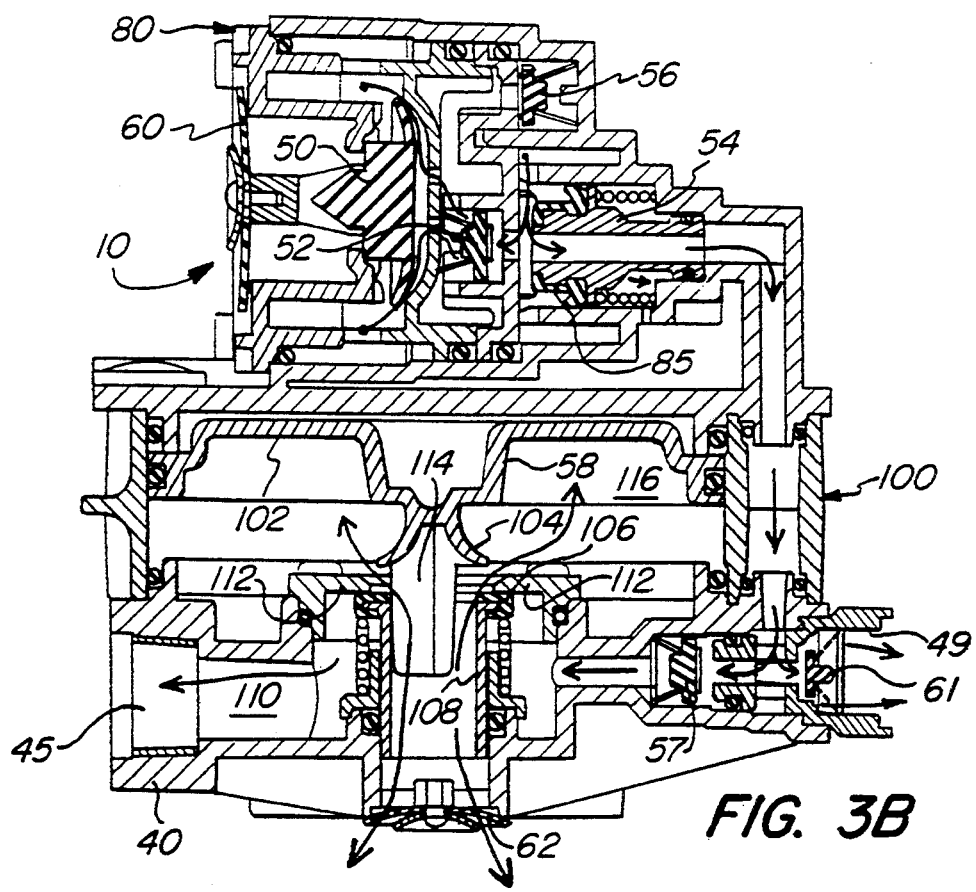

FIGS. 2B and 3B show full-function valve 10 after the pressure of the supply air in line 14 and supply air inlet 42 and the internal passageways has increased above a first predetermined pressure, typically about 70 psig. The biased pressure protection valve module 54 and first check valve 52, reservoir check valve 57 and secondary reservoir check valve 61 are now open. Pressurized air is flowing into spring brake chambers 22 via one-way check valve 52, quick release valve 50, port 46 and line 24. Pressurized air is being delivered to reservoirs 16 and 17 via one way check valves 57 and 61 respectively.

The spring brakes will release when the pressure in spring brake chambers 22 reaches a predetermined release pressure, which is typically between 45–70 psig.

When the air pressure in the spring brake chambers equals the supply air pressure, one-way check valve 52 will close, retaining the pressure in spring brake chambers 22. This will isolate the pressure in the spring brake chambers 22 from the variations in air pressure in the reservoir portions of the trailer brake system. This will also prevent the pressurized air in the spring brake chambers 22 from escaping in the event of a failure of reservoirs 16 or 17 or associated lines.

Figure 2C:
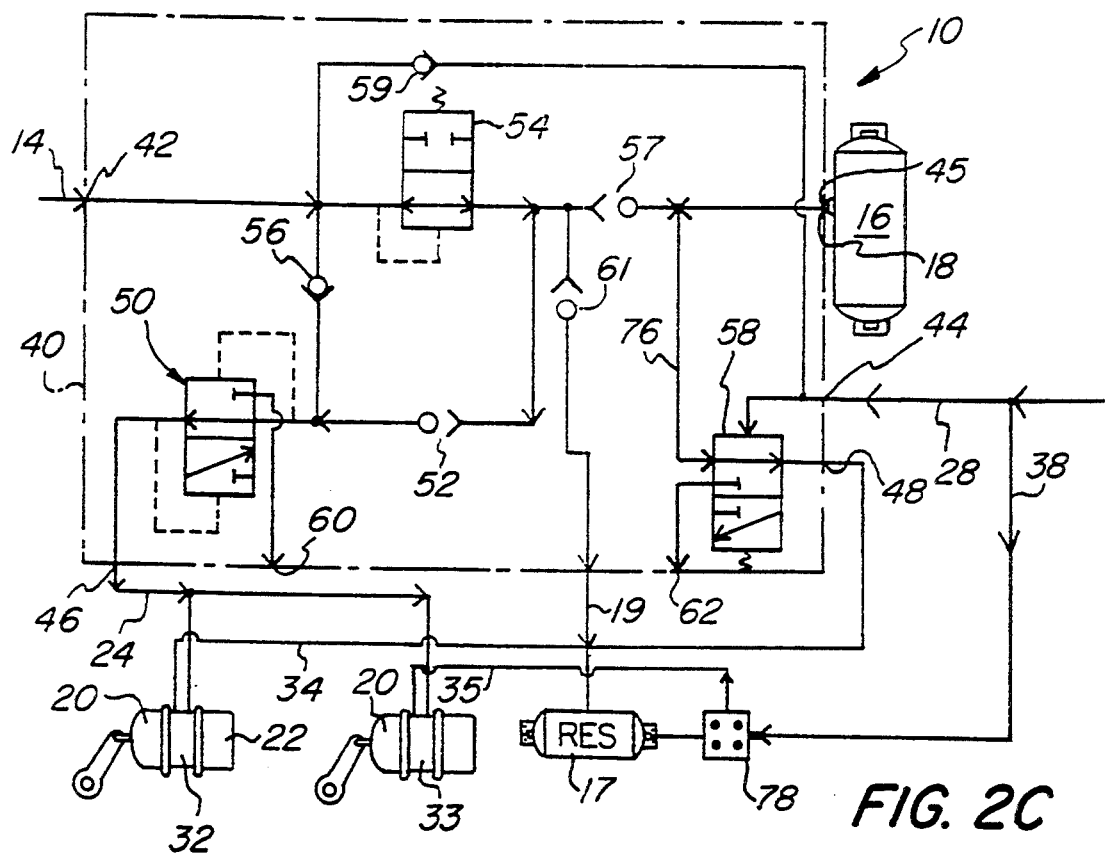
Figure 3C:
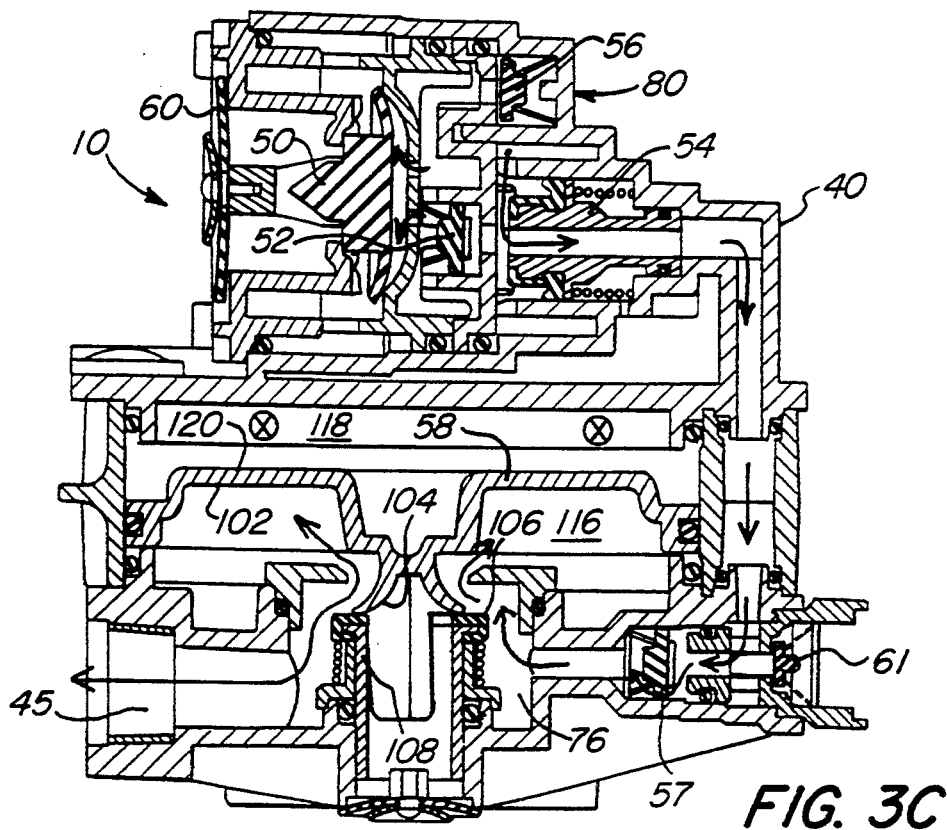
Figure 5:
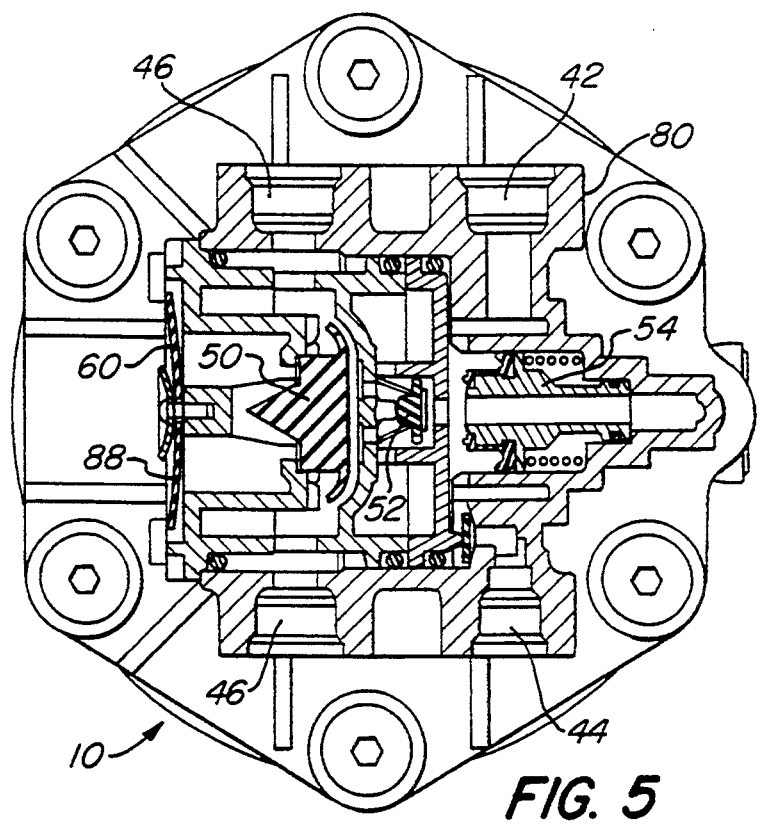
FIG. 5 is a cross-sectional top plan view of the full function valve shown in FIG. 3C.

FIGS. 2C, 3C and 5 show full-function valve 10 when service brake control air is supplied via line 28 and control air inlet 44 to the piston of relay valve module 58. It will be appreciated that relay valve module 58 may comprise other embodiments such as a diaphragm actuator or other devices as may be known in the art. As shown schematically, the module shifts and communicates pressurized air from reservoir 16 (and supply air under some circumstances) to the service brake chambers 32 via line 18, port 45, passageway 76, module 58, port 48 and line 34. This results in application of the trailer service brakes in a known manner.

A brake system using valve 10 has separate primary and secondary reservoirs 16 and 17 for operating separate sets of service brakes. In a typical two-axle semi-trailer, the primary reservoirs would provide service brake air to service brakes located on one axle, and the secondary reservoir would provide service brake air to the other axle. If desired, it would also be possible to provide "diagonal" braking service air where one reservoir would provide service air to a front left service brake and a rear right service brake, and the other reservoir would provide service brake air to the front right and rear left service brakes.

Valve 10 is provided with a secondary reservoir check valve 61 that is located to provide fluid communication between the outlet side of pressure protection valve 54 and a secondary reservoir outlet 49. Secondary reservoir 17 provides service brake air via secondary relay valve module 78. Secondary relay valve module 78 is connected to the control air line 38. When control air is provided to secondary relay valve module 78, it provides supply air to the second service brake chambers 33 from reservoir 17.

Figure 2D:
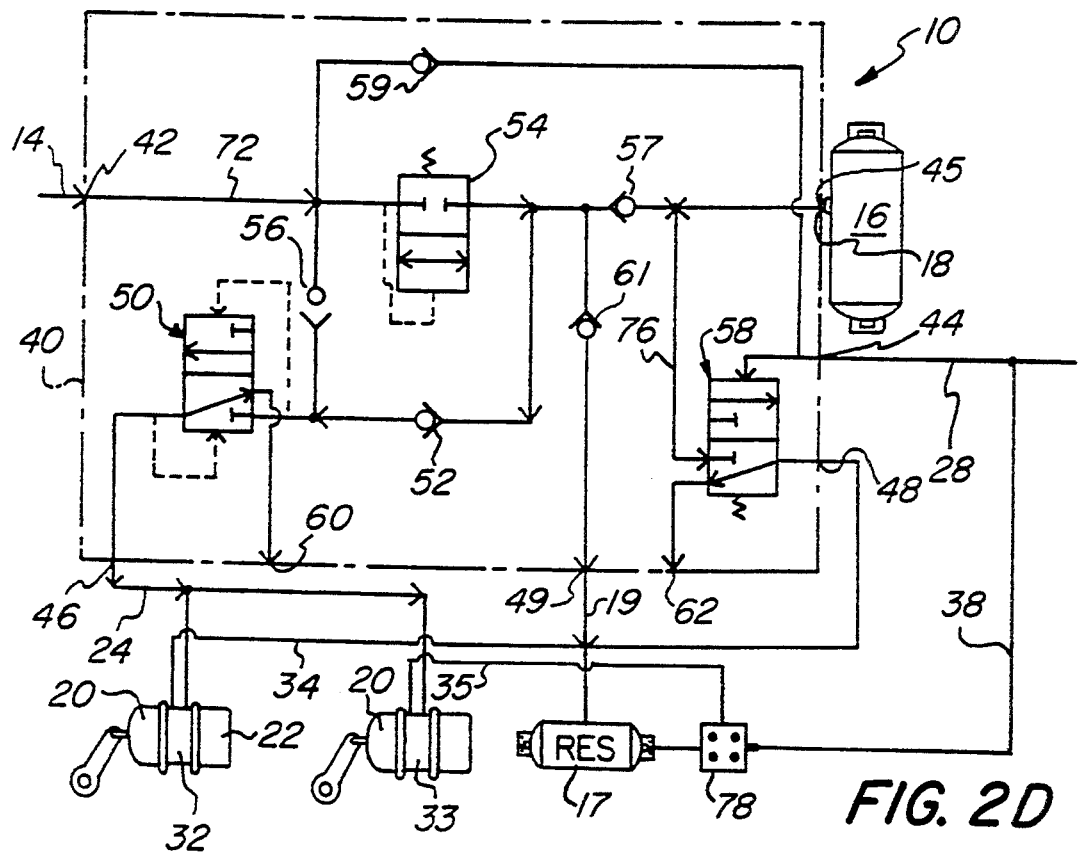
Figure 2E:
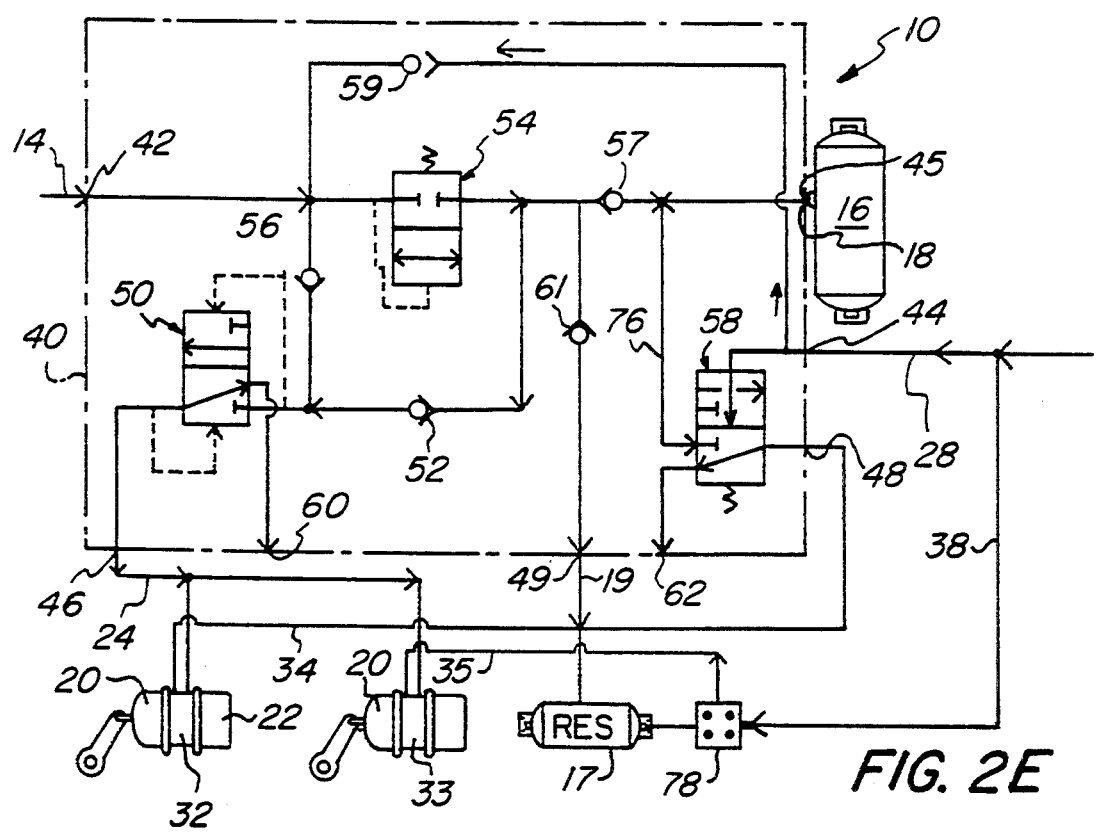
Figure 3D:
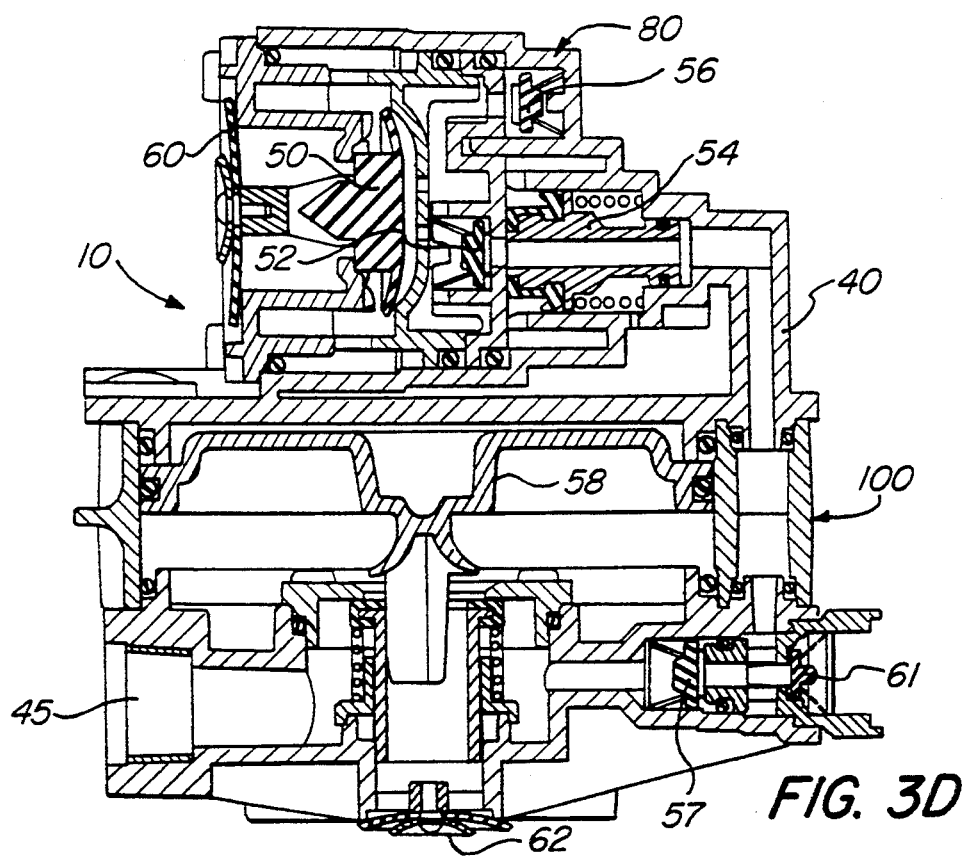
Figure 3E:
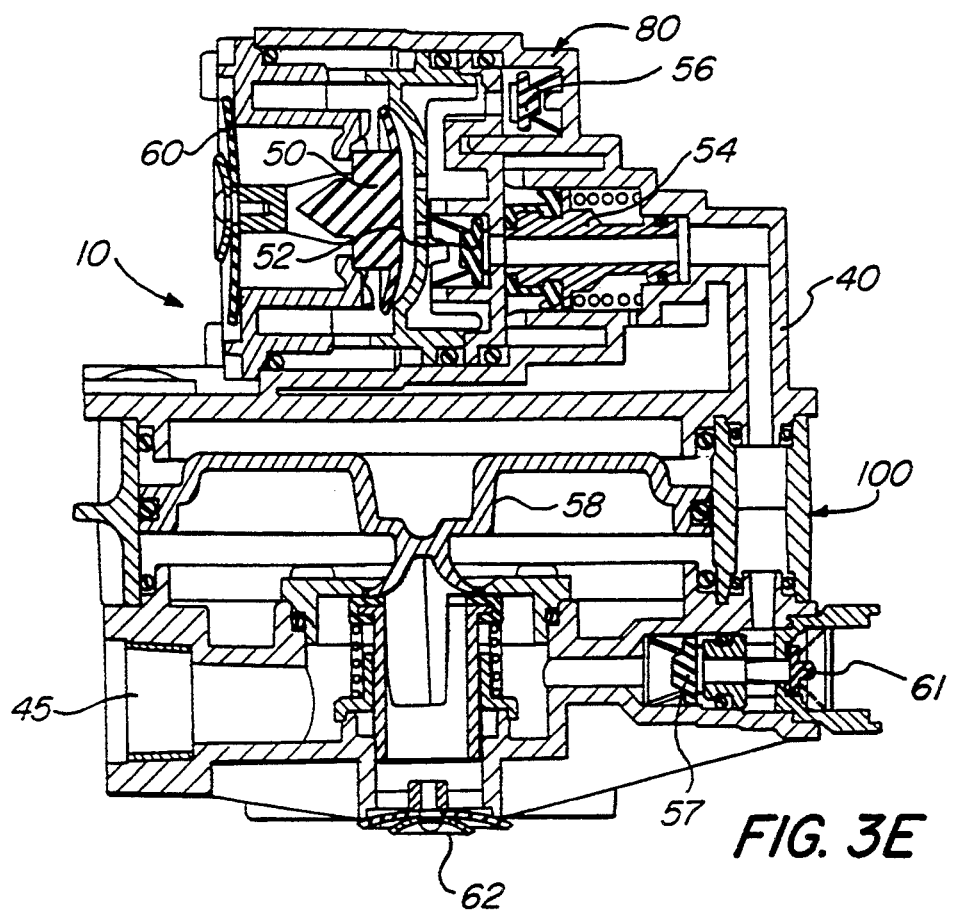

FIGS. 2D and 3D show full function valve 10 when there has been a failure or release of supply air. In such case pressure protection valve 54, and reservoir check valve 57, and secondary reservoir check valve 61 supplying reservoir 16 and secondary reservoir 17 will close to preserve service brake capability in the brake sets served by reservoirs 16 and 17. Second check valve 56 will open to exhaust the inlet pressure at quick release valve 50 to begin exhausting the spring brake chambers 22 to permit the spring brakes to engage.

Referring specifically now to FIGS. 3A-3D and 4 and 5, a physical embodiment of a valve 10 in accordance with the invention is shown. In FIGS. 3A-3D, valve 10 comprises an upper section 80, also shown in FIGS. 4 and 5, in which are located supply air inlet 42, control air inlet 44, and two spring brake outlets 46. Spring brake exhaust outlet 60 is also located in upper section 80.

Pressure protection valve 54 is located horizontally in the upper section 80 and includes a spring biased hollow piston 82 that has a sealing means such as a molded rubber seat 84 at one end that seats against a valve seat such as wall 86 to prevent fluid communication from supply air inlet 42 into the valve 10 until the supply air pressure is sufficient to open pressure protection valve 54. Supply air entering supply air inlet 42 enters chamber 87 and opens pressure protection valve 54 at a predetermined pressure, preferably about 70 psig.

First check valve 52 is located in upper section 80 directly across wall 86 from pressure protection valve 54 and through passageways is in fluid communication with adjacent quick release valve 50. Quick release valve 50 comprises a flexible rubber diaphragm having a flange 92 and a body 94 that fits into and seals against a sealing seat 96 opposite from communicating passageways leading from first check valve 52. Passageway 98 communicates with spring brake outlets 46. Second check valve 56 is located so supply air is provided thereto by a passageway leading from supply air inlet 42.

A passageway leads from pressure protection valve 54 down into a lower section 100 of valve 10. Lower section 100 comprises a housing for relay valve module 58, and includes the reservoir check valve 57 and (in one embodiment) the secondary reservoir check valve 61.

Check valves 52, 56, 57 and 61 are preferably all molded rubber check valves that will open when inlet side pressure exceeds outlet side pressure, but are normally biased to be closed. Other types of check valves, including conventional ball check valves may be used in connection with the system of the invention.

Relay valve module 58 comprises a valve disc 102 having a central flange 104 sealable against a lip 106 of a tubular core 108. Core 108 is located in a passageway 110 between the reservoir check valve 57 and reservoir outlet 45. Core 108 is spring biased to normally seal core lip 106 against a partition 112 so that passageway 110 is separated from a passageway 114 connecting service brake exhaust 62 to service brakes via chamber 116.

Referring particularly to FIG. 3C, pressurized control air is supplied to chamber 118 at an upper face 120 of valve disc 102 to cause valve disc 102 and the central flange 104 to move downwardly to press against the core 108 to depress core 108 away from partition 112 to close the communicating passageways between the service brake outlet 48 (not shown) and the service brake exhaust 62 and to open communicating passageways from the reservoir outlet 45 and the reservoir check valve 57 to the service brake chambers 32 to thereby actuate the service brakes.

Referring now to all of FIGS. 1-5, the operation of valve 10 will be further described.

Supply air enters valve 10 via line 14, and port 42. At about 70 psig, the pressure protection valve module 54 will open to allow pressurized air to enter the spring brake chambers 22 and to fill reservoirs 16 and 17 via pressure protection valve module 54.

Pressurized air cannot go directly from the supply line 14 into the spring brake chambers 22 unless there is sufficient supply air pressure to also supply the service brakes, foreclosing the possibility of the trailer being moved without service brake capability.

The service brakes 32, 33 are typically operable when reservoirs 16 and 17 are charged to about 35 psig. The spring brakes will release when the system pressure reaches between 45-70 psig. The operation of the service brakes is controlled by a foot pedal operating on relay valve module 58. Control air signals from the tractor enter relay valve module 58 and act on the piston in a conventional manner. This actuates the valve module 58, allowing air from reservoir 16 to fill the service brake chambers 32 of the brake actuators 20, resulting in brake application through conventional mechanical means. The control air will also actuate secondary valve module 78, allowing air from reservoir 17 to fill the service brake chambers 33 of the brake actuators 20 to operate the brakes controlled by the secondary system. The provision of dual reservoirs means that the failure of one reservoir is not a serious problem as the remaining reservoir will permit operation of at least one set of service brakes.

In the event of a failure of either of the air reservoirs 16 and 17, the one-way check valve 52 will prevent the quick venting of air pressure in the spring brake chambers 22. This will allow the driver to pull the trailer off of the road using the service brakes for control prior to complete application of the spring brakes.

Figure 6:
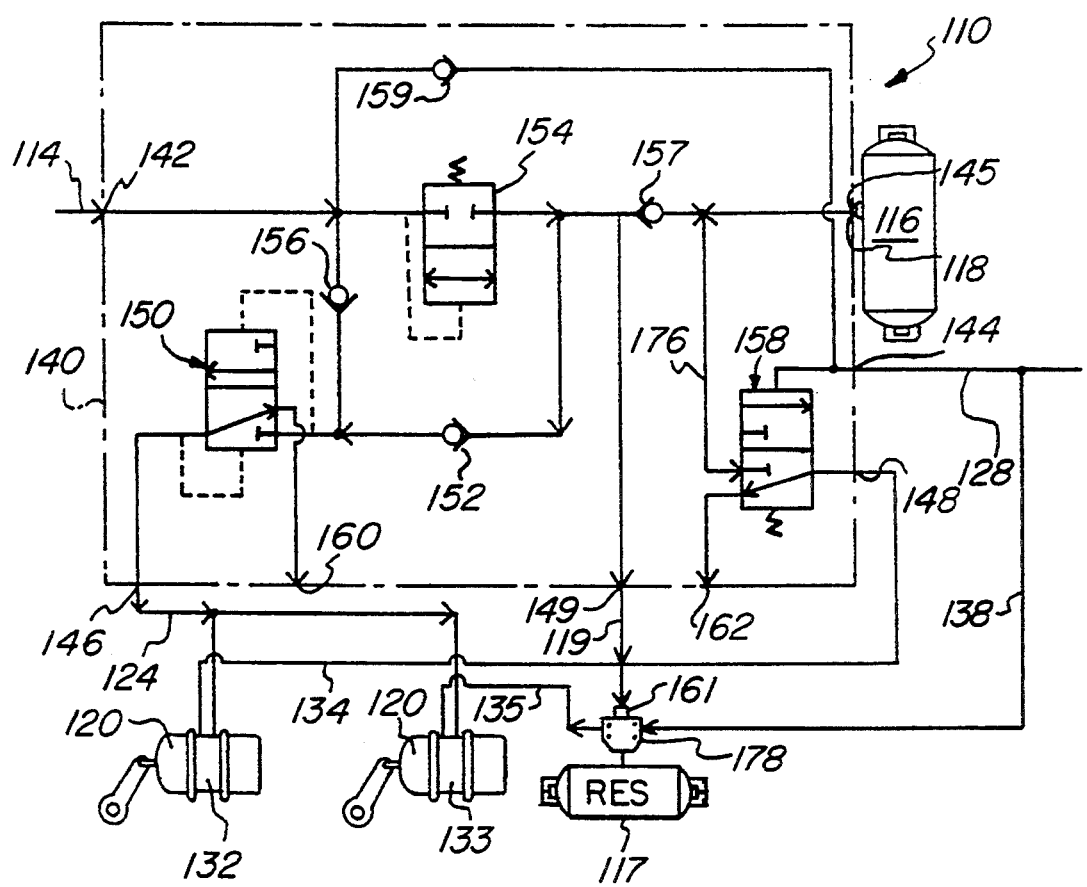
FIG. 6 is a functional schematic of an alternative embodiment of a split brake system of the present invention.
Figure 7:
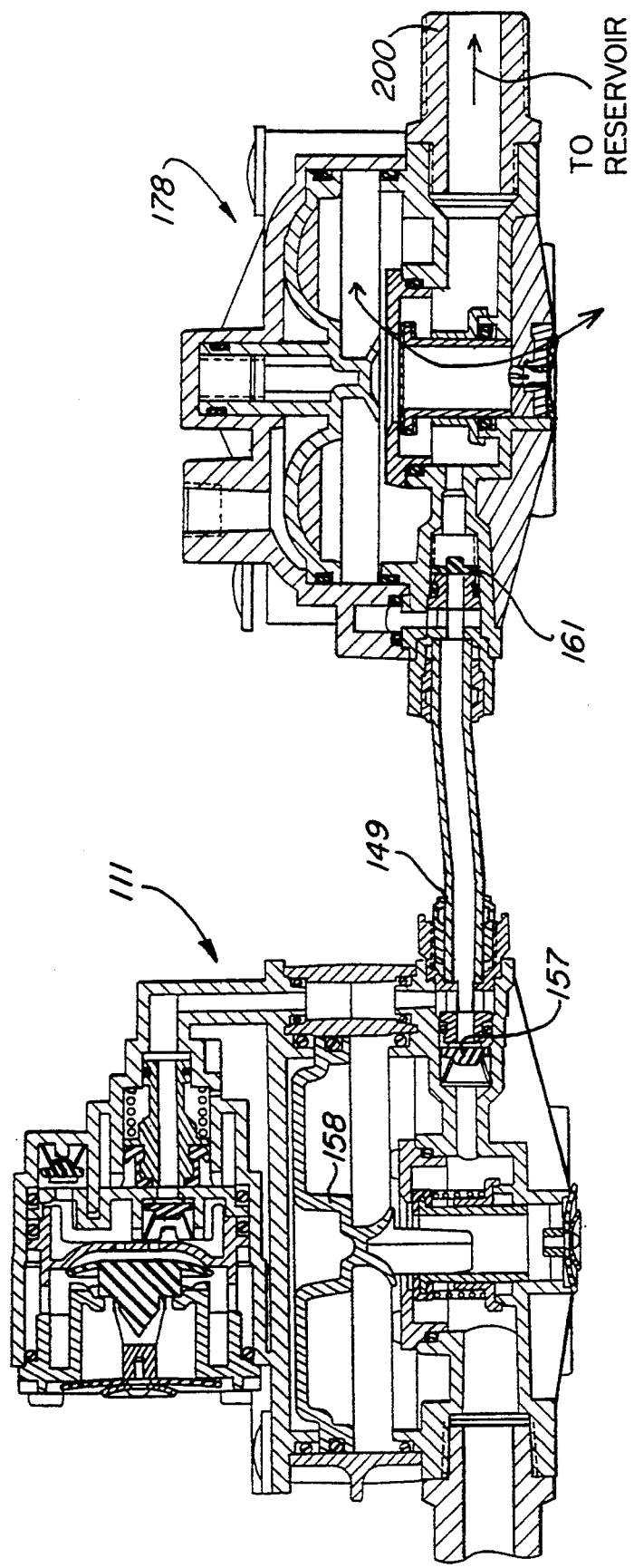
FIG. 7 is a cross-sectional elevation view of an embodiment of valves in accordance with the alternative embodiment of the invention shown in FIG. 6.

FIGS. 6 and 7 disclose a split system in accordance with the invention wherein secondary reservoir check valve is identified as 161 and is located at an inlet in secondary relay valve 178, and wherein secondary reservoir check valve 161 is in communication with outlet 149 of full function valve 111 through tubing or other passageways. Valve 111, which is essentially identical to the valve 10 described in references to FIGS. 1-5, with the exception of the secondary reservoir check valve 61 which is relocated and identified as 161. Secondary relay valve 178 has a secondary reservoir outlet 200 leading to a secondary reservoir 117.

Full-function valve 10 thus prevents drive-away prior to having adequate service brake capacity, yet provides for quick drive-away, and provides back-up reservoir air in the event of primary reservoir failure.

We claim:

1. A full function valve, comprising:
    a valve housing having a plurality of ports therein, said ports comprising a supply air inlet, a control air inlet, at least one spring brake outlet, at least one service brake outlet, a reservoir outlet, a secondary reservoir outlet, a spring brake exhaust, and a service brake exhaust; said ports extending through an outer wall of said housing;
    a plurality of valves in fluid communication with a passageway connected to said supply air inlet, said plurality of valves including a pressure protection valve module, and a quick release valve operably connected to said pressure protection valve module, said valves being openable at a selected supply air pressure when a pressure at an inlet side thereof exceeds a certain pressure to connect said supply air inlet to said spring brake outlet and to a passageway leading to a reservoir check valve;
    said reservoir check valve being located in fluid communication by passageways with said plurality of valves and said reservoir outlet, said reservoir check valve being openable when a pressure at an inlet side thereof is greater than an outlet side thereof to connect said supply air inlet to said reservoir outlet and to a relay valve;
    said relay valve being in fluid communication with said control air inlet, said relay valve being normally located to connect said service brake outlet and said service brake exhaust, and being operable when pressurized control air is supplied thereto to open a passageway to connect said reservoir outlet and supply air inlet to said service brake outlet; and
    a secondary reservoir check valve in fluid communication with said secondary reservoir outlet and said plurality of valves.

2. A full function valve in accordance with claim 1, further comprising a secondary reservoir in fluid communication with said secondary reservoir outlet, a secondary relay valve module in fluid communication with said secondary reservoir and being operably connected to pressurized control air, said secondary relay valve module being in fluid communication with a second service brake chamber.

3. A full function valve in accordance with claim 2, further comprising a primary reservoir in fluid communication with said reservoir outlet, and a spring brake chamber in fluid communication with said spring brake outlet.

4. A full function valve in accordance with claim 3, further comprising a passageway providing fluid communication between said spring brake outlet and a spring brake chamber.

5. A full function valve in accordance with claim 4, wherein said relay valve comprises a valve disc having a central flange sealable against a lip of a tubular core, said core located in said passageway between said reservoir check valve and said reservoir outlet and being spring biased to normally seal said core lip against a partition wherein said passageway from said reservoir check valve to said reservoir outlet is separated from said passageway connecting to said service brake outlet, and wherein control air is supplied to an upper face of said valve disc to cause said valve disc and central flange to move downwardly to press against said tubular core to depress said core away from said partition to close the normal connection between the service brake outlet and the service brake exhaust and to create an opening between said reservoir outlet and said service brake outlet to actuate a service brake.

6. A brake system comprising: a full function valve including:
    a valve housing having a plurality of ports therein, said ports comprising a supply air inlet, a control air inlet, at least one service brake outlet, a reservoir outlet, a secondary reservoir outlet, a spring brake exhaust, and a service brake exhaust; said ports extending through an outer wall of said housing;
    a plurality of valves including a pressure protection valve module, and a quick release valve operably connected to said pressure protection valve module, said valves being openable at a selected supply air pressure when a pressure at an inlet side thereof exceeds a certain pressure;
    a reservoir check valve being located in fluid communication by passageways with said supply air inlet via said pressure protection valve, and in fluid communication with said reservoir outlet, said reservoir check valve being openable when a pressure at an inlet side thereof is greater than an outlet side thereof to connect said supply air inlet to said reservoir outlet and to a relay valve;
    said relay valve being in fluid communication with said control air inlet, said relay valve being normally located to connect said service brake outlet and said service brake exhaust, and being operable when pressurized control air is supplied thereto to open a passageway to connect one of said reservoir outlets to said service brake outlet;
    a secondary reservoir check valve located between a secondary reservoir outlet and a passageway connecting said supply air inlet and said reservoir check valve;
    a source of pressurized supply air operably connected to said supply air inlet;
    a source of pressurized control air operably connected to said control air inlet;
    a first reservoir operably connected to said reservoir outlet;
    a first service brake chamber operably connected to said service brake outlet;
    a secondary reservoir operably connected to said secondary reservoir outlet;
    a secondary relay valve module operably connected to said source of pressurized control air and to said secondary reservoir; and
    a second service brake chamber operably connected to said secondary relay valve module.

7. A brake system comprising: a full function valve including:
    a valve housing having a plurality of ports therein, said ports comprising a supply air inlet a control air inlet, a service brake outlet, a reservoir outlet, a secondary reservoir outlet, a spring brake exhaust, and a service brake exhaust; said ports extending through an outer wall of said housing;
    a plurality of valves including a pressure protection valve module, and a quick release valve operably connected to said pressure protection valve module, said valves being openable at a selected supply air pressure when a pressure at an inlet side thereof exceeds a certain pressure;

a reservoir check valve being located in fluid communication by passageways with said supply air inlet via said pressure protection valve, and in fluid communication with said reservoir outlet, said reservoir check valve being openable when a pressure at an inlet side thereof is greater than an outlet side thereof to connect said supply air inlet to said reservoir outlet and to a relay valve;

said relay valve being in fluid communication with said control air inlet, said relay valve being normally located to connect said service brake outlet and said service brake exhaust, and being operable when pressurized control air is supplied thereto to open a passageway to connect said reservoir outlet to said service brake outlet;

a source of pressurized supply air operably connected to said supply air inlet;

a source of pressurized control air operably connected to said control air inlet;

a first reservoir operably connected to said reservoir outlet;

a first service brake chamber operably connected to said service brake outlet;

a secondary relay valve module operably connected to said source of pressurized control air, said secondary relay valve module having a secondary reservoir check valve located at an inlet port thereof, said secondary reservoir check valve being connected by passageways to said secondary reservoir outlet, said secondary relay valve being normally located to connect a secondary service brake outlet to a secondary service brake exhaust, and being operable when pressurized control air is supplied thereto to open a passageway to connect said secondary service brake outlet to said secondary reservoir outlet;

a secondary reservoir operably connected to said secondary reservoir outlet; and a second service brake chamber operably connected to said secondary service brake outlet.

* * * * *